B. R. G. DARRÉ.
AUTOMOBILE TIRE.
APPLICATION FILED NOV. 9, 1908.

916,678.

Patented Mar. 30, 1909.

WITNESSES

INVENTOR
Bruno R. G. Darré
BY
Frank H. Ashley
ATTORNEYS

UNITED STATES PATENT OFFICE.

BRUNO R. G. DARRÉ, OF NEW YORK, N. Y.

AUTOMOBILE-TIRE.

No. 916,678.

Specification of Letters Patent.

Patented March 30, 1909.

Application filed November 9, 1908. Serial No. 461,603.

*To all whom it may concern:*

Be it known that I, BRUNO R. G. DARRÉ, a subject of the Emperor of Germany, and resident of the city of New York, in the county of New York and State of New York, have invented certain new and useful Improvements in Automobile-Tires, of which the following is a specification.

This invention relates to improvements in automobile tires.

Figure 1:
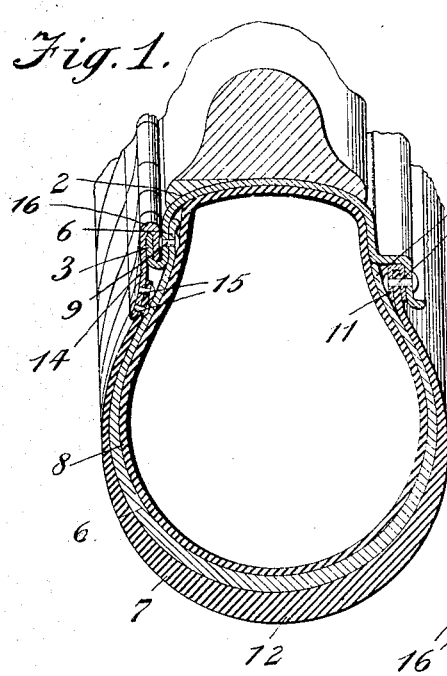
Figure 2:
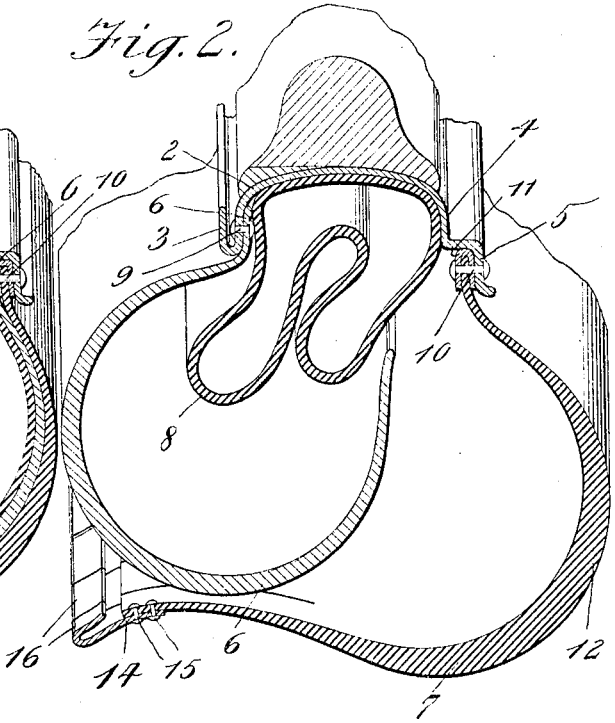
Figure 3:
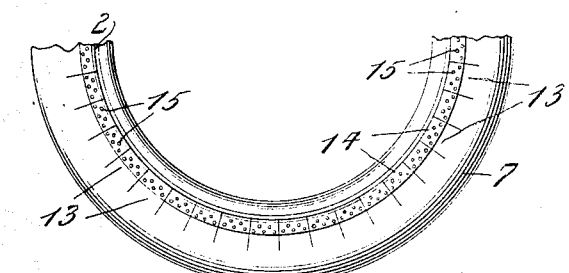
Figure 4:
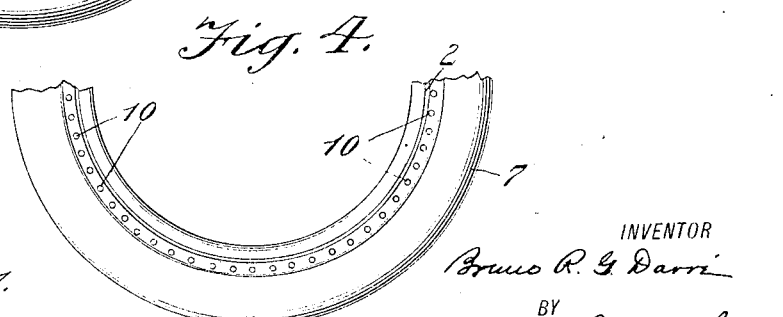

In the drawings:—Figure 1 is a cross section of a tire constructed and arranged in accordance with this invention. Fig. 2 is a cross section of the parts shown in Fig. 1, said parts being deflated, and the flaps left hanging. Fig. 3 is a side view of one-half of the wheel, the view being taken on the side of the wheel to show the securing hooks for the outer flap. Fig. 4 is a similar view taken from the opposite side of the wheel.

The principal object which this invention has in view is to provide suitable thick wall protection pieces for the inner tube of a pneumatic tire. Also to provide a structure of the character specified which facilitates the removal and replacement of the protecting flap which has been subjected to wear.

With these objects in view I have provided a metal rim or felly, 2, having a channel, 3, provided on the outer side of the wheel. This channel is extended outward to permit a line of rivets to be driven above the channel for securing rigidly to this part of the structure the inner protecting flap as hereinafter more fully set forth. The opposite side of the rim, 2, is provided with the extensions, 4, and 5, the latter being set out laterally to receive the fastenings for the outer protecting flap. Within the protecting flaps, 6, and 7, is carried the expansible rubber inner tube, 8. This expansible tube, 8, is of the usual construction. It is directly covered by the inner protecting flap, 6. This may be constructed of specially prepared canvas, or of leather. It may be further provided on the tread with the usual puncture-proof armor construction. It is secured to the one edge to the rim just above the channel, 3. This securement is by means of rivets, 9. The flap is made in a semi-tubular shape. When the inner tube is deflated this permits the free edge of the flap, 6, to pass across the rim, 2, over the inner tube, 8. The free edge is somewhat lengthened to allow it to extend well up into the rim, and into the valley thereof, between the metal and the inner tube, 8.

The outer protecting flap, 7, is rigidly secured to the rim, 2, and to the extension, 5, thereof, by means of bolts, 10. This edge of the flap, 7, is preliminarily secured within a U-shaped holding ring, 11. The ring is perforated when the edge of the flap, 7, is between the walls thereof. The flap, 7, is provided with the tread, 12, and is generally constructed as heavy as possible. At the free edge it is cut into sections, 13, that are provided with securing plates, 14, the plates being secured by means of rivets, 15. These plates are provided at the upper edge with hooks, 16, constructed to pass over the edge of the upturned metal which forms the channel, 3, of the rim. When in position these metal sections are formed to abut each upon the other as shown in Fig. 3 of drawings. The sections, 13, are separated as close to the tread, 12, as is found necessary in order that the tube may be brought sidewise over the inner flap, 6, and inner tube, 8, when the same is deflated.

When constructed as specified and as shown in the accompanying drawings the operation is as follows:—Before placing the inner tube, 8, in position the flap, 6, is riveted upon the rim as shown and described. The inner tube, 8, is secured in position on the rim by the usual method, and while in its deflated condition the flap, 6, is brought over and extended up between the extension, 4, of the rim and the inner tube as shown. The outer protecting flap, 7, is provided with the ring, 11, which as stated is perforated to receive the small bolts, 10. They are bolted into position thereby rigidly securing the edge of the flap, 7, to the rim of the wheel. The flap, 6, being in position the flap, 7, is carried over the flap, 6, to the other side of the wheel rim and plates, 14, carrying the hooks, 16, are placed in position within the channel, 3. The inner tube is now inflated; in which operation the loose parts to wit, the two flaps are moved outward and until the further movement is arrested of the flap, 7, the rotundity of the completed tire is now complete.

A particular advantage gained by this construction is, that in event of accident to either the flap, 7, or the inner tube, 8, a repair can be easily and quickly made, necessitating only that the tube, 8, should be deflated and collapsed allowing the hooks, 16, to be with-drawn from their engagement with the channel, 3, and the flap, 7, to be drawn back from over the parts, flap, 6, and tube, 8. If the injury be to the inner tube, the flap, 6, is now drawn back, and the inner tube, 8, is exposed, or may be quickly removed. If as is usual, the injury be to the outer flap, 7, it is evident that this may be readily repaired. Should the injury be of so serious a character as to warrant the removal of the flap, 7, this is readily effected by removing the flap, 7, releasing it from the bolts, 10, which are not many in number, and thereby removing the ring, 11, with the flap, 7. A further advantage in this construction is that touring cars, and others provided for an emergency accident, may carry a flap, 7, which makes a small parcel instead of, as now, a heavy shoe or complete tire.

Having thus described this invention it is claimed.

1. A tire for automobile wheels comprising, an inner tube adapted to be inflated; an inner protection flap permanently secured to one side of the rim and adapted to extend over the said inner tube; an outer protection flap permanently secured to the rim on the side of the wheel opposite that holding the first named flap and adapted to extend over the inner protection flap; and suitable means for securing the free edge of the said outer protection flap to the said rim.

2. A tire for automobile wheels comprising, an inner tube adapted to be inflated; an inner protection flap permanently secured to one side of the rim and adapted to extend over the said inner tube; an outer protection flap secured to the rim on the side of the wheel opposite that holding the first named flap and having a free edge consisting in separated extensions each of which is provided with a fastening device for securing the extensions to the rim; and suitable means provided on the rim to receive said fastening devices.

3. A tire for automobile wheels comprising, an inner tube adapted to be inflated; an inner protection flap permanently secured to one side of the rim and adapted to loosely extend over the said inner tube said flap being molded with a curved tread and substantially straight side sections; an outer protection flap permanently secured to the rim on the side of the wheel opposite that holding the first named flap and adapted to extend over the inner protection flap; a ring permanently attached to one edge of the said outer flap and adapted to be secured to the rim of the wheel; and suitable means for securing the free end of the said outer protection flap to the said rim.

4. A tire for automobile wheels comprising, an inner tube adapted to be inflated; an inner protection flap permanently secured to one side of the rim and adapted to extend loosely over the said inner tube said flap being molded with a curved tread and substantially straight side sections; an outer protection flap secured to the rim on the side of the wheel opposite that holding the first named flap and having a free edge consisting in separated sections each of which is provided with a fastening device for securing the section to the rim; a ring permanently attached to one edge of the said outer flap and adapted to be secured to the rim on the wheel; and suitable means provided on the rim to receive said fastening device.

5. A tire for automobile wheels comprising, an inner tube adapted to be inflated; an inner protection flap permanently secured to one side of the rim and adapted to extend loosely over the said inner tube, said flap being molded with a curved tread and substantially straight side sections; an outer protection flap secured to the rim on the side of the wheel opposite that holding the first named flap and having a free edge consisting in separated extensions, each of which is adapted to receive a fastening device for securing the extension to the rim; a ring permanently attached to one edge of the said outer flap and adapted to be secured to the rim of the wheel; a rim for said wheel provided with an upturned flange, and a series of hooks attached to the free edge of said outer flap and adapted to engage the said upturned flange to fasten the outer flap.

6. A tire for automobile wheels comprising, an inner tube adapted to be inflated; an inner protection flap permanently secured to one side of the rim and adapted to extend loosely over the said inner tube said flap being molded with a curved tread and substantially straight side sections; an outer protection flap molded to form a rounded tread and having substantially straight side sections one of said sections being permanently secured to the rim on the side of the wheel opposite that holding the first named flap and the other of said side sections formed by a series of short extensions each extension being adapted to receive a fastening device for securing it to the rim; a ring permanently attached to one edge of the said outer flap and adapted to be secured to the rim of the wheel; a rim for said wheel provided with an upturned flange; and a series of hooks attached to the free edge of said outer flap adapted to engage the said upturned flange.

Signed at New York in the county of New York and State of New York this 18th day of September A. D. 1908.

BRUNO R. G. DARRÉ.

Witnesses:
E. F. MURDOCK,
DANIEL DE V. HARNED.